UNITED STATES PATENT OFFICE.

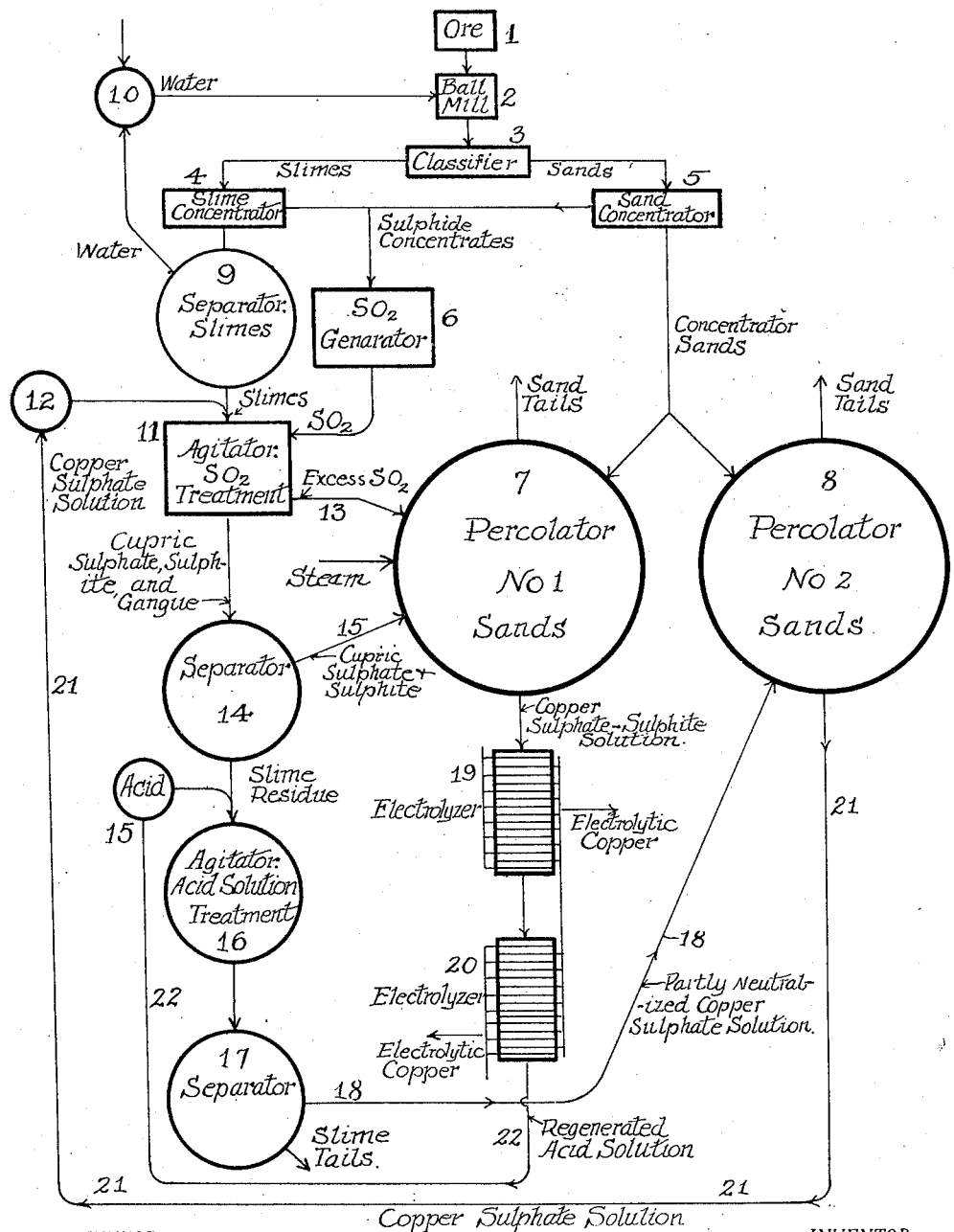

WILLIAM E. GREENAWALT, OF DENVER, COLORADO.

METALLURGICAL PROCESS.

1,328,666. Specification of Letters Patent. Patented Jan. 20, 1920.

Application filed August 5, 1918. Serial No. 248,471.

*To all whom it may concern:*

Be it known that I, WILLIAM E. GREENA-WALT, a citizen of the United States, residing in the city and county of Denver and State of Colorado, have invented certain new and useful Improvements in Metallurgical Processes, of which the following is a specification.

The invention will be described more particularly in the treatment of copper ores to extract the copper by the use of sulfurous and sulfuric acids, and has for its principal objects the regeneration of sufficient acid as the solvent for the copper, by means of sulfur dioxid, to make the process self sustaining, and to effectively apply the sulfur dioxid in the electrodeposition of the copper to reduce the power required by depolarization.

Sulfur dioxid is usually cheaply available at all copper mines; in the pyrometric treatment of ores it is a waste product. Sulfuric acid is ordinarily very expensive. If sulfur dioxid could be largely substituted for sulfuric acid in the leaching of copper ores, a considerable saving could be made. Sulfur dioxid dissolved in water gives sulfurous acid, $H_2SO_3$. This is a relatively weak acid, and is not comparable in its action upon ores of metals, as a solvent for the metals, to the more energetic action of sulfuric acid. Copper oxid and carbonate are soluble in sulfurous acid as the sulfite, $CuSO_3$. Copper sulfite is an unstable salt, which is slowly changed into a mixture of cupro-cupric sulfite and cupric sulfate. For the purpose of this description, however, it will be regarded as the cupric sulfite. The salt is only slightly soluble in water, but is quite soluble in sulfurous acid, or in a solution of copper sulfate, which has an important bearing on this process.

It is well known that in the extraction of copper from its ores by solvent processes the difficulty of extraction increases with the amount of copper extracted. The first 50 per cent. of the copper in an ore is quite easily extracted by any suitable solvent: it is quite readily extracted with sulfurous acid. The next 25 per cent. is more difficult of extraction: it is not readily extracted with sulfurous acid, but may be quite readily extracted with sulfuric acid. Of the remaining 25 per cent. it is not likely that a complete extraction can be made under any conditions of commercial operation.

In a leaching process, such, for example, one in which sulfuric acid is used as the solvent, a certain amount of the acid combines with elements other than copper, such as lime, and the acid so combined cannot be regenerated in the precipitation of the copper by a regenerative process. In regenerative processes, such as in the precipitation of the copper by electrolysis or hydrogen sulfid, only the acid combined with the copper is, ordinarily, regenerated. It follows, therefore, that acid regenerated by the precipitation of the copper, will not, of itself, make the process self sustaining in acid, and that acid from some external source will have to be supplied to make up for the acid consumed in combining with elements in the ore which are incapable of regeneration.

In the present process this difficulty is met by applying sulfur dioxid, in the presence of water or of nearly neutral copper sulfate solution, to the fresh ore. The sulfurous acid then acts on the copper which is readily soluble, and then after the maximum effect of the sulfurous acid has been obtained, draining the solution from the ore, and completing the extraction with the more energetic sulfuric acid. The copper sulfate-sulfite solution, resulting in part from the sulfurous acid treatment, is electrolyzed to deposit the copper, with the simultaneous regeneration of sulfuric acid, and this regenerated sulfuric acid is then used in the second stage of the leaching to complete the extraction of the copper from the ore. Suppose, for example, that 50 per cent. of the soluble copper in the ore is readily made soluble by sulfurous acid. and 50 per cent. by sulfuric acid: by a regenerative precipitation process, as by electrolysis, the copper made soluble by sulfurous acid as well as that made soluble by sulfuric acid, will be regenerated as sulfuric acid, and this will give sufficient acid to make the process self sustaining in sulfuric acid, and avoid the necessity of manufacturing or purchasing sulfuric acid, as such.

It is not the idea to apply the regenerated acid direct to the fresh ore, either in the absence or in the presence of the sulfurous acid. The regenerated sulfuric acid, being vastly more energetic than the sulfurous acid, the desired effect of the sulfurous acid cannot be realized in the presence of the sulfuric acid.

It has been observed that if sulfuric acid is added to a copper solution obtained by treating the ore with sulfurous acid, the sulfur dioxid is liberated, the color of the liquid changes from a greenish blue to blue, indicating, apparently, that the sulfite is changed to the sulfate of copper. Under these conditions it would be quite useless, or at least inefficient, to apply sulfurous acid to the ore simultaneously with the sulfuric acid. The sulfuric acid would act to the more or less exclusion of the sulfurous acid, and if copper sulfite were formed, it would immediately be changed to the sulfate with the liberation of sulfur dioxid. The sulfurous acid would not become effective until the sulfuric acid had become neutralized, and by that time the copper which is readily extractable by sulfurous acid will already have been extracted by the sulfuric acid.

If it is desired to obtain a rich solution of copper sulfate and sulfite, the practically neutral copper sulfate solution from a previous charge is used in the application of the sulfurous acid. Manifestly, the copper sulfate solution, being practically neutral, will not contain sufficient acid to appreciably act on the copper in the ore or to displace the sulfur dioxid from the copper made soluble by the sulfurous acid, and as already stated, the copper sulfite is more or less soluble in a solution of copper sulfate, and the resulting solution will be a mixture of sulfate and sulfite, and this may have an important bearing on the electrodeposition of the copper and regeneration of acid. After the copper sulfate-sulfite solution is separated from the ore, the regenerated sulfuric acid solution may be applied to the ore to complete the extraction, as copper sulfate, and this copper sulfate solution is then, preferably, used in the application of sulfurous acid to a fresh charge of ore.

It was stated that sulfuric acid applied to a copper sulfite solution will liberate sulfur dioxid and convert the copper sulfite to the sulfate. If, now, a solution of copper sulfate and sulfite is electrolyzed to deposit the copper, sulfuric acid will, of course, be produced at the same time. The sulfuric acid so liberated, will then act on the sulfite of copper to convert it into the sulfate with the simultaneous liberation of sulfur dioxid; so that in the end, all of the copper, whether in the form of sulfate or sulfite, will be converted into the pure electrolytic metal, with a regeneration of an equivalent of sulfuric acid. The sulfur dioxid, liberated during the electrolytic action, acts directly, itself, as a depolarizer, and indirectly, through its reducing action on the ferric sulfate, which is inevitably present in all leach solutions and electrolyte, to form ferrous sulfate, and the ferrous sulfate so formed appears to act even more energetically as a depolarizer than the sulfur dioxid. This effective deplorizing action reduces the E. M. F. required in the deposition, and also gives a greatly increased current efficiency.

Having now given the chemical basis of the process and a general description of its application, it will be further described by referring to the accompanying drawing, which represents a diagrammatic sketch, or flow sheet, of the preferred method of carrying it out practically, although I do not want to be understood as limiting the process to any particular apparatus or method of operation.

From the bin 1, the ore, which may be regarded as a mixture of oxids and sulfids, is fed, with water, into the ball mill 2, where it is ground to the desired fineness, ordinarily from 8 to 20 mesh. The pulp then flows into a classifier 3, where it is separated into sands and slimes, the sands passing to the sand concentrator 5 to remove the sulfids and others concentratable copper, and the slimes to the slime concentrator 4. The sulfid concentrates pass on to the sulfur dioxid generator 6, which may be regarded as any of the well known types of roasting furnace.

The sands are charged into the percolators, 7 and 8, which may be regarded as ordinary leaching vats with a filter bottom. The sands, with the slimes eliminated, are easily and uniformly percolated. Percolator No. 1 may be regarded as containing a fresh charge of sands, and percolator No. 2 as containing a partly treated charge, especially treated with sulfurous acid, or sulfur dioxid.

The slime pulp, from the concentrator 4, passes to the separator, or de-waterer, 9. The water is returned to the ball mill as desired, through the reservoir 10. The dewatered slimes, or thickened pulp, flow into the agitator 11, into which is also introduced a copper sulfate solution, preferably resulting from the treatment of a previous charge and presumably nearly neutral, and also sulfur dioxid from the sulfur dioxid generator 6. It is preferred to use a fairly strong gas in the agitator 11; this necessitates a considerable excess, and this excess of sulfur dioxid is introduced into the bottom of percolator No. 1, and passing upwardly through the moist sands, is entirely consumed in acting on the copper in the sands, as well as on such other constituents affected by the gas. Ordinarily, much of the soluble iron, both in the agitator 11 and the percolator No. 1 will be acted upon by the gas, as also the lime. This will greatly economize the more expensive sulfuric acid which would also act on these constituents which are acted upon by the sulfurous acid. The sulfur dioxid in agitator 11, when it goes into solution, may, of course, be regarded as sulfurous acid.

When the slimes have been sufficiently treated in agitator 11, the mixture, which may be regarded as the gangue, cupric sulfate and sulfite, ferrous sulfate, and sulfurous acid, passes on to the separator 14, where the solution containing the cupric sulfate and sulfite, ferrous sulfate and sulfurous acid, is separated from gangue, or residue, and passed through the fresh ore in percolator No. 1, the excess gas from the agitator having, of course, been switched to another fresh lot of sands.

The slime residue, containing now only the more difficult extractable copper, passes on to the acid agitator 16.

The copper solution, issuing from the separator 14, and passing through the sands in the percolator No. 1, issues from the percolator, thoroughly clarified, practically neutral, and contains the copper as sulfite and sulfate, ferrous iron, and some sulfurous acid. This solution flows into the electrolyzers, or copper deposition tanks 19 and 20, where the copper is electrolytically deposited on the cathodes while an equivalent of acid is produced at the anodes. This acid, produced by the electrolysis, immediately acts on the copper sulfite to convert it into the sulfate, with the simultaneous liberation of the combined sulfur dioxid, and the sulfur dioxid acts as a depolarizer, and also to reduce any ferric salts, which may be formed by the electrolysis, to the ferrous condition, and these ferrous salts then again act as a depolarizer. It is well known that in the electrolytic treatment of leach copper solutions, the vital problem is presented by the iron which is leached with the copper. Ferrous sulfate is quite harmless, and may even be highly beneficial by acting as a depolarizer in the electrolytic deposition of the copper. Ferric salts, on the other hand, are highly injurious, because, unless otherwise taken care of, they are reduced at the expense of the deposited copper, thus representing inefficiencies proportional to the amount of ferric sulfate in the electrolyte. Conditions can arise in which the copper is dissolved by the ferric sulfate as rapidly as it is deposited. The importance of the reduction of the ferric sulfate as contemplated in this process, is evident. It must also be evident that the sulfur dioxid is exceedingly effectively applied, because it is liberated only in proportion as acid is regenerated, and is liberated in a nascent condition in the vicinity of the anode, where the ferric sulfate is formed.

The solution, issuing from the electrolyzers 19 and 20, now impoverished in copper and enriched in acid, flows into the acid solution reservoir 15, where it is flowed into the acid agitator 16, where the more difficultly extractable copper is extracted with the energetic acid solution. The acid treated slimes flow into the separator 17, where the tailings are separated from the acid solution, now somewhat enriched in copper sulfate. The tailings go to waste. The acid solution from the separator 17, flows through the pipe line 18, into percolator No. 2, where the remaining acid is consumed in acting on the copper in the sands in the percolator. The copper sulfate solution, issuing from percolator No. 2, now neutral, or containing only a small amount of acid, flows through the pipe line 21 into the copper sulfate solution storage tank 12, from which it is drawn into the agitator 11 as desired. If, for any reason, copper sulfate solution is not available in the quantities desired, water can, of course be used, instead, to bring the readily soluble copper into solution with sulfurous acid. A copper sulfate solution, however, is preferred, for the reason that copper sulfite is more or less soluble in copper sulfate solution, and the mixture of sulfate and sulfite gives a richer and better solution for electrolysis. Ordinarily, the copper sulfate solution will be conveniently produced as described. This copper sulfate solution will frequently take the form of wash water, containing some copper sulfate, and which is then enriched in copper by the action of the sulfurous acid.

It will be understood that no fast line is to be drawn on the copper sulfate solution as to its acidity or neutrality. The object would be to have it as nearly neutral as possible, but practical operations may call for some latitude. The basic idea, in using the copper sulfate solution, is to dissolve as much copper from the ore as possible with sulfurous acid and as little as possible, within practical limits, with sulfuric acid.

While any suitable apparatus may be used for carrying out the process, an apparatus such as that described in my co-pending application, Serial No. 16,962, filed March 25, 1915, is preferred for the agitator 11, and in addition, the apparatus described in my co-pending applications, Serial No. 145,884, filed Feb. 1, 1917, and Serial No. 231,534, filed April 29, 1918, for the electrolyzers, 19 and 20. The well known Dorr thickeners may be used for the separators 9, 14, and 22, and the well known Dorr agitator, for the acid agitator 16.

If the copper sulfate solution is applied to the leaching vat after the treatment with sulfurous acid, the effect of the sulfurous acid persists practically during the entire operation, and the issuing copper sulfate solution, containing also copper sulfite, smells strongly of sulfur dioxid, and the solution usually has a deep blue color, indicating complete reduction.

The ferric sulfate formed by the electrolysis may also be reduced by the cupric sulfite, both in the electrolyzer and in the leaching vats. It is evident that under these conditions the solution from the leaching vats is completely reduced and a high efficiency of the electric current is obtainable in the cells. The reduced electrolyte greatly tends to reduce the E. M. F. required in the copper deposition, and greatly retards the disintegration of the insoluble anodes. The cupric sulfite may to a large extent also act as a depolarizer.

The process has been more particularly described in reference to sulfate solutions; it is also applicable to chlorid solutions.

The action of the sulfurous acid on the copper in the ore is more effective at elevated temperatures. Steam may be introduced into the bottom of the leaching vats with the sulfur dioxid if it is desired to hasten the reaction.

I claim:

1. A metallurgical process which consists in treating ores of copper with sulfurous acid in the presence of a solution of copper sulfate to extract a portion of the copper, electrolyzing the resulting solution containing the copper as sulfate and sulfite to deposit the copper and regenerate sulfuric acid, and then applying the regenerated sulfuric acid solution to the ore to extract the remainder of the extractable copper.

2. A metallurgical process which consists in treating ores of copper with sulfurous acid in the presence of a solution of copper sulfate to extract a portion of the copper, electrolyzing the resulting solution containing the copper as sulfate and sulfite to deposit the copper and regenerate sulfuric acid, applying the regenerated sulfuric acid solution to the ore to extract the remainder of the extractable copper as sulfate, and then treating a fresh lot of ore with sulfurous acid and the copper sulfate solution so formed.

3. A metallurgical process which consists in treating ores of copper with sulfurous acid to extract a portion of the copper, electrolyzing the resulting copper solution to deposit the metal and regenerate sulfuric acid, applying the regenerated sulfuric acid solution to the ore to extract the remainder of the extractable copper as sulfate, and then treating a fresh lot of ore with sulfurous acid and the copper sulfate solution so formed.

4. A metallurgical process which consists in dissolving a portion of the copper in an ore as the sulfate with sulfuric acid and a portion as the sulfite with sulfurous acid, and then electrolyzing the copper sulfate in the presence of the copper sulfite whereby the copper sulfite is converted into the copper sulfate with the simultaneous liberation of sulfur dioxid by the acid regenerated in the deposition of the copper from the sulfate.

5. A metallurgical process which consists in treating ores of copper with a solution of sulfuric acid to dissolve the copper as sulfate, and then electrolyzing the copper sulfate solution in the presence of a copper compound capable of liberating sulfur dioxid with the sulfuric acid regenerated during the deposition of the copper.

6. A metallurgical process which consists in treating ores of copper with a solution of sulfuric acid to dissolve the copper as sulfate, then treating a fresh lot of ore with sulfurous acid in the presence of the copper sulfate solution so formed, then electrolyzing the copper sulfate-sulfite solution to deposit the copper and regenerate sulfuric acid, applying the regenerated sulfuric acid solution to the ore treated with sulfurous acid to form copper sulfate, and then again applying the copper sulfate solution with sulfurous acid in the treatment of fresh ore.

7. A metallurgical process which consists in crushing ores of copper to a suitable fineness, separating the sands from the slimes, charging the sands into a percolation vat, gasing the moist sands with sulfur dioxid which with the moist sands forms sulfurous acid and reacts with the copper in the ore to convert it into the sulfite, and then applying a copper sulfate solution to the ore to remove the cupric sulfite formed by the sulfurous acid.

8. A metallurgical process which consists in crushing ores of copper to a suitable fineness, separating the sands from the slimes, charging the sands into a percolation vat, gasing the moist sands with sulfur dioxid which with the moisture in the sands forms sulfurous acid and reacts with the copper in the ore to convert it into the sulfite, and then applying a copper sulfate solution to the ore to remove the cupric sulfite formed by the sulfurous acid, electrolyzing the resulting solution containing the copper as sulfate and sulfite to deposit the copper and regenerate sulfuric acid, and then applying the regenerated sulfuric acid solution to the ore to complete the extraction of the copper.

9. A metallurgical process which consists in crushing ores of copper to a suitable fineness, separating the sands from the slimes, charging the sands into a percolation vat, gasing the moist sands with sulfur dioxid which with the moisture in the sands forms sulfurous acid and reacts with the copper in the ore to convert it into sulfite, applying a solution to the ore which is capable of removing the copper sulfite from the ore, electrolyzing the resulting copper solution to deposit the copper and regenerate acid, and then applying the regenerated acid solution to the ore to complete the extraction of the copper.

10. A metallurgical process which consists in treating ores of copper with sulfurous acid to extract a portion of the copper as the sulfite, separating the resulting copper sulfite solution from the ore, electrolyzing the resulting copper sulfite solution to deposit the copper and regenerate acid, and then applying the regenerated acid solution to the ore to extract the remainder of the copper.

11. A metallurgical process which consists in treating ores of copper with sulfurous acid in the presence of a solution of a copper salt to extract a portion of the copper, electrolyzing the resulting solution to deposit the copper and regenerate acid, applying the regenerated acid solution to the ore to extract the remainder of the extractable copper, and then treating a fresh lot of ore with sulfurous acid and the copper salt solution so formed.

12. A metallurgical process which consists in dissolving a portion of the copper in an ore as a cupric salt and a portion as the sulfite with sulfurous acid, and then electrolyzing the cupric salt in the presence of the copper sulfite whereby the copper sulfite is converted into a cupric salt with the simultaneous liberation of sulfur dioxid by the acid regenerated in the deposition of the copper from the cupric salt.

13. A metallurgical process which consists in treating ores of copper with a solution of an acid to dissolve the copper as a cupric salt, and then electrolyzing the cupric salt solution in the presence of a compound capable of liberating sulfur dioxid with the acid regenerated during the deposition of the copper.

14. A metallurgical process which consists in crushing ores of copper to a suitable fineness, separating the sands from the slimes, charging the sands into a percolation vat, gasing the moist sands with sulfur dioxid which with the moisture in the sands forms sulfurous acid and reacts with the copper in the ore to convert it into the sulfite, and then applying a copper salt solution to the sands to remove the cupric sulfite formed by the sulfurous acid, electrolyzing the resulting solution to deposit the copper and regenerate acid, and then applying the regenerated acid solution to the ore to complete the extraction of the copper.

WILLIAM E. GREENAWALT.

Witnesses:
MARY H. WOOLSEY,
CORA M. GREENAWALT.